(12) United States Patent
Iikawa et al.

(10) Patent No.: US 9,310,669 B2
(45) Date of Patent: *Apr. 12, 2016

(54) CAMERA BODY, LENS BARREL AND LENS-INTERCHANGEABLE CAMERA

(75) Inventors: Makoto Iikawa, Tokyo (JP); Makoto Niwa, Saitama (JP); Yuji Kogure, Saitama (JP); Takahiro Kobayashi, Saitama (JP); Masahiro Inazuka, Saitama (JP); Ichiro Taguchi, Saitama (JP); Kosei Kosako, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/126,552

(22) PCT Filed: Jun. 8, 2012

(86) PCT No.: PCT/JP2012/064765
§ 371 (c)(1),
(2), (4) Date: Dec. 16, 2013

(87) PCT Pub. No.: WO2012/173050
PCT Pub. Date: Dec. 20, 2012

(65) Prior Publication Data
US 2014/0119721 A1 May 1, 2014

(30) Foreign Application Priority Data

Jun. 17, 2011 (JP) ................................. 2011-135255

(51) Int. Cl.
*G03B 17/14* (2006.01)
(52) U.S. Cl.
CPC ............ *G03B 17/14* (2013.01); *G03B 2206/00* (2013.01)

(58) Field of Classification Search
USPC ........................................................ 396/531
See application file for complete search history.

(56) References Cited

U.S. PATENT DOCUMENTS

| | | | | |
|---|---|---|---|---|
| 2,618,201 A | * | 11/1952 | August Brohl et al. | 396/531 |
| 3,758,198 A | * | 9/1973 | Kanie et al. | 359/828 |
| 4,199,248 A | * | 4/1980 | Schlapp et al. | 396/531 |

(Continued)

FOREIGN PATENT DOCUMENTS

| | | |
|---|---|---|
| CN | 1940720 | 4/2007 |
| EP | 0062422 | 10/1982 |

(Continued)

OTHER PUBLICATIONS

WIPO International Search Report, mail date is Sep. 18, 2012.

(Continued)

*Primary Examiner* — Clayton E Laballe
*Assistant Examiner* — Linda B Smith
(74) *Attorney, Agent, or Firm* — Greenblum & Bernstein P.L.C.

(57) ABSTRACT

A camera body includes a plurality of body-side bayonet lugs which are provided on the peripheral edge of an opening; and a protrusion which is positioned in a circular-arc opening formed between adjacent body-side bayonet lugs of the body-side bayonet lugs, the distance between the protrusion and either of adjacent two body-side bayonet lugs of the body-side bayonet lugs being shorter than each of the lens-side bayonet lugs; and a body-side mount surface with which the lens-side bayonet surface comes into contact from the front side when the lens-side bayonet lugs are positioned immediately behind the body-side bayonet lugs.

11 Claims, 4 Drawing Sheets

(56) References Cited

U.S. PATENT DOCUMENTS

| | | | | |
|---|---|---|---|---|
| 4,247,190 | A * | 1/1981 | Hashimoto et al. | 396/530 |
| 4,659,203 | A * | 4/1987 | Niwa et al. | 396/531 |
| 4,864,341 | A * | 9/1989 | Maekawa et al. | 396/532 |
| 5,274,413 | A * | 12/1993 | Nomura et al. | 396/529 |
| 5,570,153 | A * | 10/1996 | Shono | 396/531 |
| 6,421,192 | B2 * | 7/2002 | Nomura et al. | 359/828 |
| 6,921,283 | B2 * | 7/2005 | Zahlit et al. | 439/489 |
| 7,599,617 | B2 * | 10/2009 | Tokiwa et al. | 396/532 |
| 8,016,498 | B2 * | 9/2011 | Hirai | 396/529 |
| 8,218,066 | B2 * | 7/2012 | Tsukatani et al. | 348/360 |
| 2004/0136777 | A1 * | 7/2004 | Iikawa et al. | 403/349 |
| 2007/0077063 | A1 | 4/2007 | Tokiwa et al. | |
| 2010/0194974 | A1 | 8/2010 | Hoshikawa | |

FOREIGN PATENT DOCUMENTS

| | | |
|---|---|---|
| EP | 0788021 | 8/1997 |
| JP | 06-047943 | 6/1994 |
| JP | 2004-212880 | 7/2004 |
| JP | 2005-140846 | 6/2005 |
| JP | 2007-316520 | 12/2007 |
| JP | 2010-044203 | 2/2010 |
| JP | 2010-117571 | 5/2010 |

OTHER PUBLICATIONS

WIPO Written Opinion, Sep. 18, 2012.
Search report from E.P.O., mail date is Feb. 13, 2015.
Office Action issued in China Patent Appl. No. 201280029696.X, dated Dec. 25, 2015.

* cited by examiner

Fig. 5

CAMERA BODY, LENS BARREL AND LENS-INTERCHANGEABLE CAMERA

TECHNICAL FIELD

The present invention relates to a camera body, a lens barrel and a lens-interchangeable camera.

BACKGROUND ART

Lens-interchangeable cameras which include a camera body and a lens barrel which can be attached and detached to and from a substantially circular opening formed on the front of the camera body are known in the art (e.g., Patent Literatures 1 and 2).

This type of camera body is provided on the edge of the opening thereof with a plurality of (e.g., three) body-side bayonet lugs which project toward the inner peripheral side and is provided behind each body-side bayonet lug with a biaser which produces a rearward biasing force. On the other hand, the interchangeable lens barrel is provided at the rear end thereof with a plurality of (e.g., three) lens-side bayonet lugs which project toward the outer peripheral side.

When the interchangeable lens barrel is mounted to the camera body, firstly the lens-side bayonet lugs are inserted into the camera body through a plurality of circular-arc openings, each of which is formed between adjacent body-side bayonet lugs, and the lens-side bayonet lugs are positioned immediately behind the body-side bayonet lugs, respectively, by rotating the lens barrel on its optical axis. Thereupon, each lens-side bayonet lug is biased to move rearward by the associated biaser, and the lens-side mount surface that is formed on the lens barrel comes into contact, from the forward direction, with the body-side mount surface that is formed on the camera body, so that the lens barrel is fixedly mounted to the camera body.

The lens barrel and the camera body are each provided with contact members, and the contact members of the lens barrel and the contact members of the camera body are electrically connected only when the lens barrel and the camera body are connected at a predetermined relative rotational angular position, and therefore, the lens barrel and the camera body need to be connected at the predetermined relative rotational angular position.

To this end, the body-side bayonet lugs, the circular-arc openings and the lens-side bayonet lugs are each intentionally made mutually different in lengthwise dimension (circumferential length) so as to allow each lens-side bayonet lug to be loosely engaged into only the predetermined circular-arc opening.

Accordingly, even if one attempts to connect the lens barrel and the camera body to each other at a position other than the predetermined relative rotational angular position, the long-size body-side bayonet lug is prevented from entering the camera body by the short-size circular-arc opening, and therefore, there is no possibility of the lens barrel being mistakenly mounted to the camera body at any incorrect relative rotational angular position.

CITATION LIST

Patent Literature

Patent Literature 1: Japanese Unexamined Patent Publication No. 2010-44203

Patent Literature 2: Japanese Unexamined Patent Publication No. 2010-117571

SUMMARY OF THE INVENTION

Technical Problem

If the lens barrel, in particular, is miniaturized in order to miniaturize the camera, each body-side bayonet lug, each circular-arc opening and each lens-side bayonet lug also become small in lengthwise dimension with the miniaturization of the lens barrel. Accordingly, when the camera is miniaturized, large differences in dimensions between the body-side bayonet lugs, between the circular-arc openings and between the lens-side bayonet lugs cannot be provided, so that each difference in dimensions becomes minute.

However, if each difference in dimension is minute, when one attempts to connect the lens barrel to the camera body with the axis of the lens barrel being inclined at a position other than the predetermined relative rotational angular position, there is a possibility of the lens-side bayonet lugs passing through the circular-arc openings to thereby cause the lens barrel and the camera body to be improperly mounted to each other.

The present invention provides a camera body, a lens barrel and a lens-interchangeable camera, wherein the lens barrel and the camera body can be reliably prevented from being improperly mounted to each other by a simple structure without incurring a significant increase in cost even in the case where the camera body is miniaturized.

Solution to Problem

A camera body according to the present invention is characterized by having a substantially circular opening formed in a front side thereof, a lens barrel being capable of being attached and detached to and from the opening, wherein the lens barrel includes a plurality of lens-side bayonet lugs which are provided at a rear end of the lens barrel and project toward an outer peripheral side, a recessed portion which is formed on an outer edge of one of the lens-side bayonet lugs, and a lens-side mount surface, and wherein the camera body includes a plurality of body-side bayonet lugs which are provided on a peripheral edge of the opening and project toward an inner peripheral side; a protrusion which is positioned in a circular-arc opening, formed between mutually adjacent body-side bayonet lugs of the body-side bayonet lugs, the protrusion being loosely engaged in the recessed portion when each of the lens-side bayonet lugs is positioned in a corresponding the circular-arc opening, and being positioned at a different circumferential position from the lens-side bayonet lugs which are positioned immediately behind the body-side bayonet lugs, wherein a distance between the protrusion and either of adjacent two body-side bayonet lugs of the body-side bayonet lugs is shorter than the length of each of the lens-side bayonet lugs; and a body-side mount surface with which the lens-side bayonet surface comes into contact from a front side when the lens-side bayonet lugs are positioned immediately behind the body-side bayonet lugs.

The number of the body-side bayonet lugs and the number of the lens-side bayonet lugs can be three. In such a case, at least one of the three body-side bayonet lugs can be different in length from the other of the three body-side bayonet lugs, and the protrusion can be positioned in one of three of the circular-arc openings that is the greatest in length. Furthermore, the three body-side bayonet lugs can be mutually different in length.

The body-side bayonet lugs can have a circular-arc shape, and the camera body can include a circular arc protrusion which is positioned inside the camera body and projects forward, the circular arc protrusion being spaced toward the inner peripheral side from one of the circular-arc openings on which the protrusion is not provided and two of the body-side bayonet lugs that are adjacent to the one of circular-arc openings on which the protrusion is not provided, and the circular protrusion being concentric with the body-side bayonet lugs.

A lens barrel according to the present invention is characterized by being capable of being attached and detached to and from a substantially circular opening formed in a front side of a camera body, wherein the camera body includes a plurality of body-side bayonet lugs which are provided on a peripheral edge of the opening and project toward an inner peripheral side, a protrusion which is positioned in a circular-arc opening formed between adjacent body-side bayonet lugs of the body-side bayonet lugs, and a body-side mount surface, wherein the lens barrel includes a plurality of lens-side bayonet lugs which are provided at a rear end of the lens barrel and project toward an outer peripheral side, each of the lens-side bayonet lugs being longer than a distance between the protrusion and either of adjacent two body-side bayonet lugs of the body-side bayonet lugs, and being positioned at different circumferential positions from the protrusion when positioned immediately behind the body-side bayonet lugs; a recessed portion which is formed on an outer edge of one of the lens-side bayonet lugs, and in which the protrusion is loosely engaged when each the lens-side bayonet lugs is positioned in a corresponding the circular-arc opening; and a lens-side mount surface which comes into contact with the body-side bayonet surface from the front side when the lens-side bayonet lugs are positioned immediately behind the body-side bayonet lugs.

The number of the body-side bayonet lugs and the number of the lens-side bayonet lugs can be three.

Furthermore, at least one of the three lens-side bayonet lugs can be different in length from the other of the three lens-side bayonet lugs, and the recessed portion can be formed on one of the three lens-side bayonet lugs that is the greatest in length.

A lens interchangeable camera according to the present invention is characterized by including a camera body which includes a plurality of body-side bayonet lugs which are provided on a peripheral edge of an opening formed in a front side of the camera body and project toward an inner peripheral side, a protrusion which is positioned in a circular-arc opening formed between adjacent body-side bayonet lugs of the body-side bayonet lugs, and a body-side mount surface; and a lens barrel which includes a plurality of lens-side bayonet lugs which are provided at a rear end of the lens barrel and project toward an outer peripheral side, each of the lens-side bayonet lugs being longer than a distance between the protrusion and either of adjacent two body-side bayonet lugs of the body-side bayonet lugs, and being positioned at different circumferential positions from the protrusion when positioned immediately behind the body-side bayonet lugs; a recessed portion which is formed on an outer edge of one of the lens-side bayonet lugs, and in which the protrusion is loosely engaged when each the lens-side bayonet lugs is positioned in a corresponding the circular-arc opening; and a lens-side mount surface which comes into contact with the body-side bayonet surface from the front side when the lens-side bayonet lugs are positioned immediately behind the body-side bayonet lugs.

A lens interchangeable camera according to another aspect of the present invention is characterized by including a camera body which includes a plurality of body-side bayonet lugs which are provided on a peripheral edge of an opening formed in a front side of the camera body and project toward an inner peripheral side, a plurality of body-side circular-arc openings which are formed between the body-side bayonet lugs that are adjacent to one another, and a body-side mount surface; and a lens barrel which includes a plurality of lens-side bayonet lugs which are provided at a rear end of the lens barrel and project toward an outer peripheral side, a plurality of lens-side circular-arc openings which are formed between the lens-side bayonet lugs that are adjacent to one another, and a lens-side mount surface which comes into contact with the body-side bayonet surface from the front side when the lens-side bayonet lugs are positioned immediately behind the body-side bayonet lugs. A recessed portion is formed on one of the lens-side bayonet lugs, and a protrusion, which is loosely engaged in the recessed portion when each the lens-side bayonet lugs is positioned in corresponding one of the body-side circular-arc openings and which is positioned at a different circumferential position from the lens-side bayonet lugs positioned immediately behind the body-side bayonet lugs, is provided in one of the body-side circular-arc openings, wherein a distance between the protrusion and either of adjacent two body-side bayonet lugs of the body-side bayonet lugs is shorter than each of the lens-side bayonet lugs; or a recessed portion is formed on one of the body-side bayonet lugs, and a protrusion, which is loosely engaged in the recessed portion when each the body-side bayonet lugs is positioned in corresponding one of the lens-side circular-arc openings and which is positioned at a different circumferential position from the body-side bayonet lugs positioned immediately in front of the lens-side bayonet lugs, is provided in one of the lens-side circular-arc openings, wherein a distance between the protrusion and either of adjacent two lens-side bayonet lugs of the lens-side bayonet lugs is shorter than each of the body-side bayonet lugs.

The number of the body-side bayonet lugs and the number of the lens-side bayonet lugs can be three.

At least one of the three body-side bayonet lugs can be different in length from another of the three body-side bayonet lugs, the protrusion can be positioned in one of three of the circular-arc openings that is the greatest in length, at least one of the three lens-side bayonet lugs can be different in length from the other of the three lens-side bayonet lugs, and the recessed portion can be formed on one of the three lens-side bayonet lugs that is the greatest in length.

Advantageous Effects of the Invention

According to the present invention, when the lens barrel and the camera body are connected at a predetermined (normal) relative rotational angular position, the lens-side bayonet lugs enter the camera body through the circular-arc openings, respectively, with the recessed portion of the lens barrel or the camera body loosely engaged with the protrusion of the camera body or the lens barrel. Therefore, after this entry, rotating the lens barrel on the optical axis thereof to position the lens-side bayonet lugs immediately behind the body-side bayonet lugs causes the lens-side mount surface, which is formed on the lens barrel, to come into contact with the body-side mount surface, which is formed on the camera body, from the front side, thus making it possible to mount the lens barrel to the camera body.

On the other hand, when one attempts to connect the lens barrel and the camera body to each other at a position other than the predetermined (normal) relative rotational angular position, any one of the lens-side bayonet lugs is securely prevented from entering the camera body by the protrusion. Accordingly, the lens barrel and the camera body can be reliably prevented from being improperly mounted to each other.

Moreover, the improper mounting prevention device according to the present invention has a simple structure that is configured of the protrusion, which is formed on the camera body or the lens barrel, and the recessed portion, which is formed on the lens barrel or the camera body, thus also not incurring a significant increase in cost.

DESCRIPTION OF EMBODIMENT

An embodiment according to the present invention will be hereinafter discussed with reference to the attached drawings. Forward and rearward directions, leftward and rightward directions, and upward and downward directions that are described in the following description are defined based on the directions of arrows shown in the drawings.

As shown in the drawings, the present embodiment of the camera 10 is provided with a camera body 20 and a lens barrel 50 which can be attached and detached to and from each other.

Figure 3:
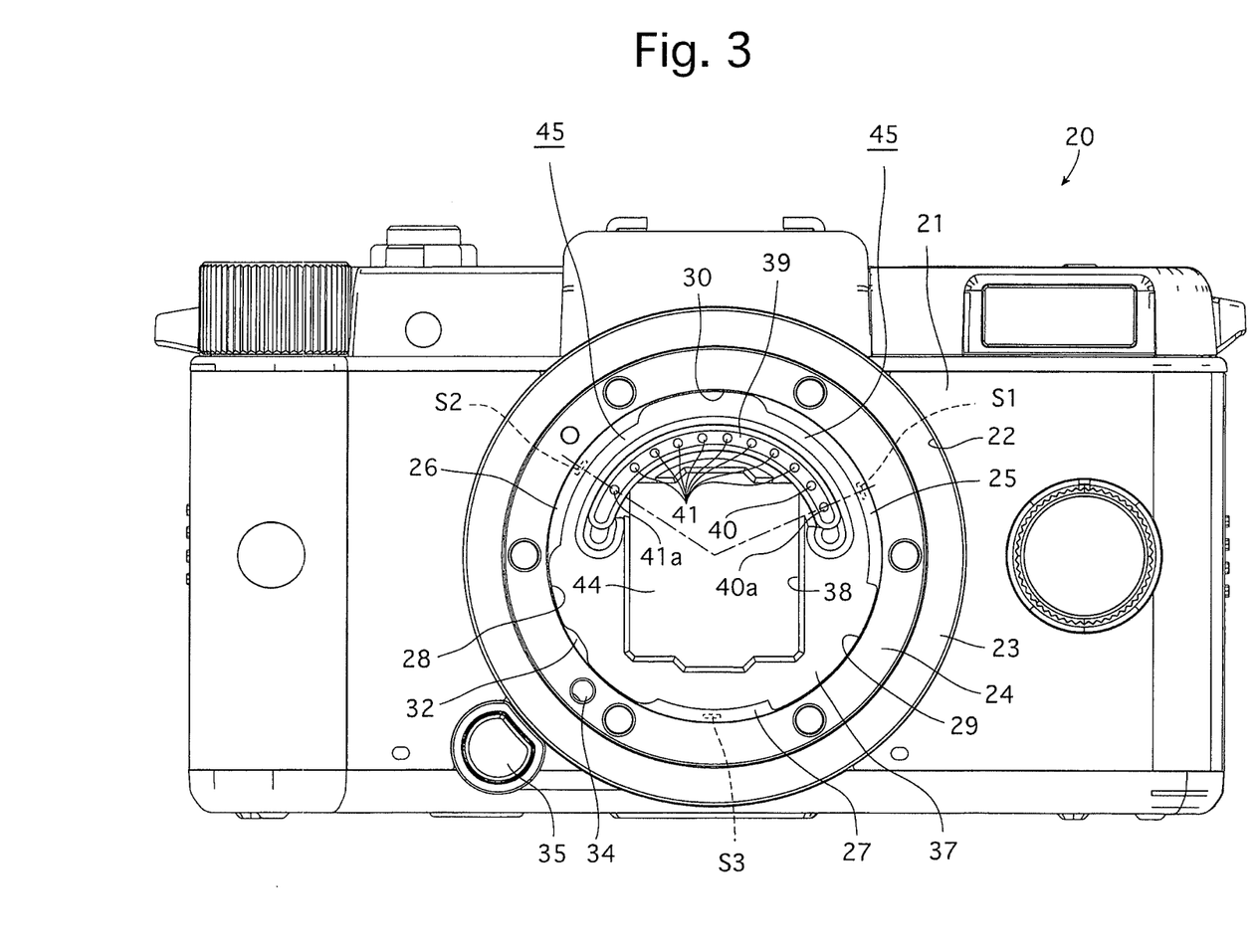
FIG. 3 is a front elevational view of the camera body.
Figure 7:
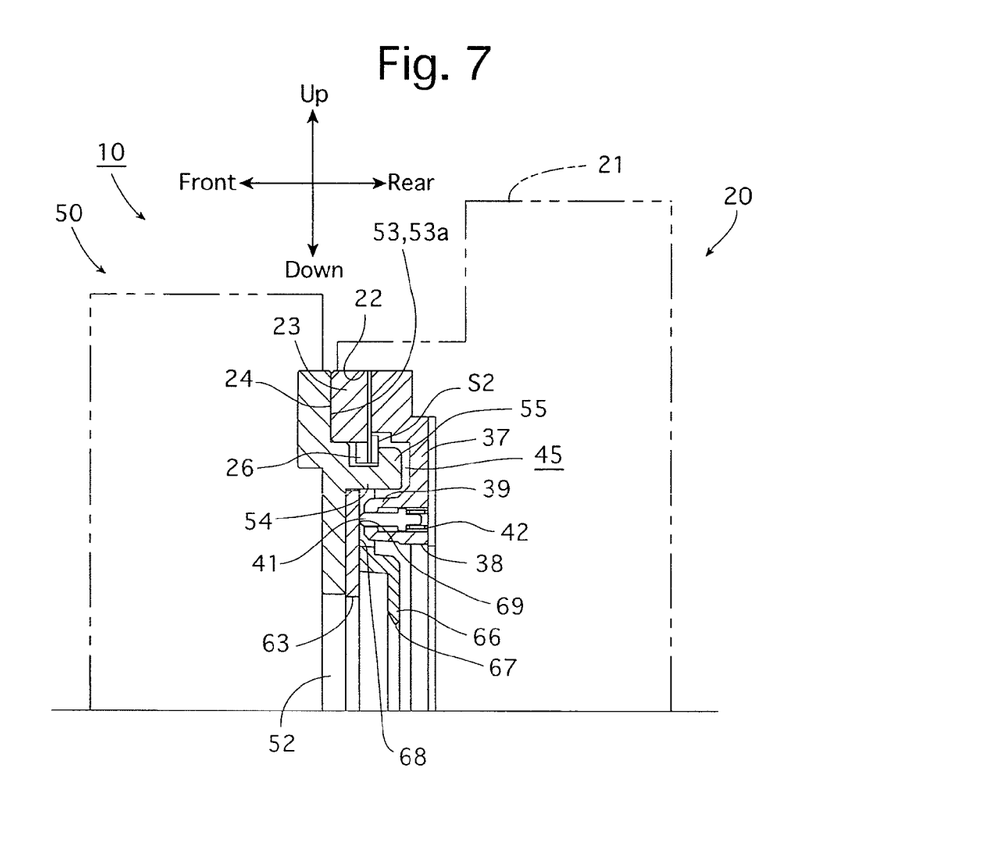
FIG. 7 is a longitudinal sectional view of a central portion of the camera taken along the line VII-VII shown in FIG. 1, wherein the barrel body and the external casing are schematically simplified and shown by imaginary lines.

The camera body 20 is provided with a hollow external casing 21. A plurality of operating buttons are provided on the upper and front surfaces of the external casing 21, and an LCD is provided on the back of the external casing 21. A circular opening hole 22 is formed in a central portion of the front of the external casing 21, and a body-side mount ring 23 made of metal which has a substantially ring shape is fitted into the opening hole 22 and fixed thereto. The inner peripheral side portion of the front of the body-side mount ring 23 is formed as a body-side mount surface 24 which projects a step forward from the position of the outer peripheral side portion of the front of the body-side mount ring 23. The body-side mount ring 23 is provided, on the edge of the opening thereof at positions a step rearward from the position of the body-side mount surface 24, with body-side bayonet lugs 25, 26 and 27 which are integrally formed to project toward the inner peripheral side. The body-side bayonet lugs 25, 26 and 27 are circular arc in shape about the center axis of the opening hole 22 (the optical axis of the lens barrel 50 when the lens barrel 50 is connected; an axis orthogonal to the body-side mount surface 24) and are provided at substantially equi-angular intervals in a circumferential direction about this center axis. The body-side bayonet lug 26 is greater in length (circumferential length) than the body-side bayonet lug 27, and the body-side bayonet lug 25 is even greater in length than the body-side bayonet lug 26. Additionally, body-side circular-arc openings 28, 29 and 30, each of which is circular arc in shape about the aforementioned center axis, are formed between the adjacent body-side bayonet lugs 25, 26 and 27. As shown in the drawings, the body-side circular-arc opening 29, which is formed between the body-side bayonet lugs 25 and 27, is greater in length (circumferential length) than the body-side circular-arc opening 30, which is formed between the body-side bayonet lugs 25 and 26, and the body-side circular-arc opening 28, which is formed between the body-side bayonet lugs 26 and 27, is even greater in length than the body-side circular-arc opening 29. As shown in FIGS. 3 and 7, biasing springs S1, S2 and S3 (rearward biasers) which each produce a rearward biasing force by being resiliently deformed forwardly are arranged at equi-angular intervals of 120 degrees in the circumferential direction of the mount surface and installed onto the rear surfaces of the body-side bayonet lugs 25, 26 and 27, respectively. Additionally, a protrusion 32 which is positioned at a middle position between the body-side bayonet lugs 26 and 27 (i.e., at a circumferentially middle position of the body-side circular-arc opening 28) and shorter in length (circumferential length) than the body-side bayonet lug 27 is integrally projected from the edge of the opening of the body-side mount ring 23 at the same position as the body-side bayonet lugs 25, 26 and 27 with respect to the forward/rearward direction. No biasing spring corresponding to the biasing spring S1, S2 or S3 is installed onto the rear surface of the protrusion 32. The distance (circumferential length) between the protrusion 32 and the body-side bayonet lug 26 and the distance (circumferential length) between the protrusion 32 and the body-side bayonet lug 27 are each smaller than the circumferential length of a lens-side bayonet lug 57 which will be discussed later.

A lock pin 34 which extends in the forward/rearward direction is installed in a circular hole which is formed in the body-side mount surface 24 in the vicinity of the lower end thereof. The lock pin 34 is freely slidable in the forward/rearward direction between a locked position, to project forward from the body-side mount surface 24, and an unlocked position, to be fully accommodated in the circular hole, and the lock pin 34 is biased to move toward the locked position by the forward biasing force of a biaser installed in the circular hole. In addition, a lock release button 35 is installed in a hole formed on the front of the external casing 21. The lock release button 35 is freely slidable between a non-operating position, to project forward from the front of the external casing 21, and an operating position, to be fully accommodated in the hole, and the lock release button 35 is biased to move toward the non-operating position by the forward biasing force of a biaser installed in the hole. When the lock release button 35 is in the non-operating position (when the lock release button 35 is not pressed rearward), the lock pin 34 is in the locked position. When the lock release button 35 is in the operating position (when the lock release button 35 is pressed rearward), the lock pin 34 moves to the unlocked position against the biasing force of the aforementioned biaser.

In the internal space of the external casing 21, an intermediate support plate 37 made of synthetic resin which has a substantially disk shape orthogonal to the aforementioned center axis is installed. The entire surface of the intermediate support plate 37 (which includes a circular arc protrusion 39 which will be discussed later) is black in color, and a surface-texturing process has been performed on this entire surface. As shown in FIG. 7, the outer edge of the intermediate support plate 37 is fixed to the outer edge of the rear of the body-side mount ring 23, and a central rectangular aperture 38, in the shape of a rectangle, is formed in a central part of the intermediate support plate 37.

Figure 1:
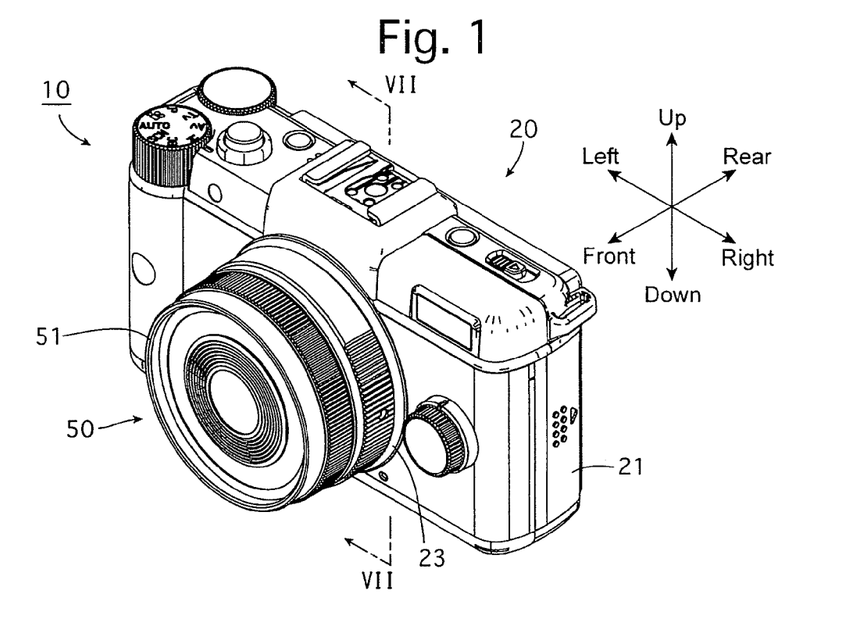
FIG. 1 is front perspective view of an embodiment of a camera according to the present invention.
Figure 2:
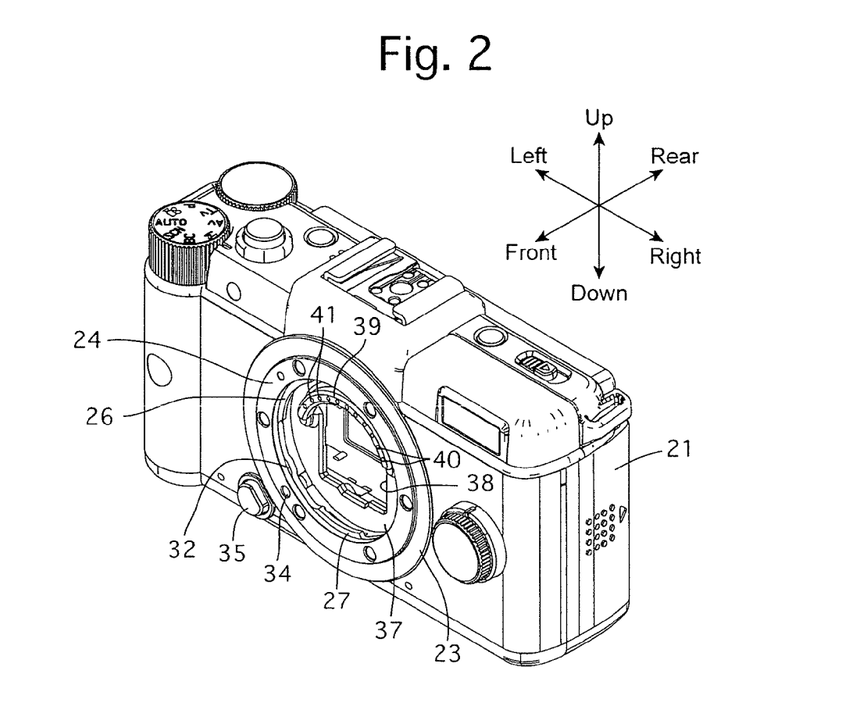
FIG. 2 is a front perspective view of the camera body.

The circular arc protrusion 39, which is positioned immediately above the central rectangular aperture 38 and is centered about the aforementioned center axis, is integrally projected forward from the front of the intermediate support plate 37. Since the opening hole 22 (the body-side mount ring 23) is small in diameter, right and left portions of the circular arc protrusion 39 face the body-side bayonet lugs 25 and 26 in radial directions of the opening hole 22 as viewed from front, respectively. In addition, a central portion of the circular arc protrusion 39 radially faces the body-side circular-arc opening 30. A plurality of pin support holes are formed in the front surface of the circular arc protrusion 39 to be arranged at equal intervals, and metal contact pins 40, 40a, 41 and 41a (body-side contact portions) are installed in the pin support holes. The front surface of the circular arc protrusion 39 projects forward to a position substantially identical to the position of the body-side bayonet lug 26. The contact pins 40, 40a, 41 and 41a are freely slidable between a projected position (see FIGS. 2 and 3) to project greatly forward from the front of the circular arc protrusion 39 and a pressed position to be pressed rearward to be fully embedded in the circular arc protrusion 39, and the contact pins 40, 40a, 41 and 41a are biased to move toward the projected position by forward biasing forces of compression coil springs 42 (see FIG. 7; contact biasers) which are installed in the pin support holes, respectively. As shown in FIG. 7, in a state where the lens barrel 50 is mounted to the camera body 20 (also in a state where the lens barrel 50 is not mounted to the camera body 20), the front ends of the contact pins 40, 40a, 41 and 41a are positioned behind the body-side mount surface 24 and in front of the rear surfaces (opposed surfaces) of the body-side bayonet lugs 25, 26 and 27. The two contact pins 40 and 40a at the far right are connected to a battery (not shown) which is installed in a rear space located behind the intermediate support plate 37, and each contact pin 41 and 41a is connected to a controller (not shown; which is equipped with a CPU, etc.) which is installed in the aforementioned rear space. As viewed from the front, the contact pin 40a at the far right and the biasing spring S1 lie on an extension line (see a one-dot chain line in FIG. 3) of a radial direction of the circular arc protrusion 39, and the contact pin 41a at the far left and the biasing spring S2 lie on an extension line (see a one-dot chain line in FIG. 3) of a radial direction of the circular arc protrusion 39 as shown in FIG. 3.

An image pickup device 44 which is positioned immediately behind the central rectangular aperture 38 and immediately below the circular arc protrusion 39 (in the vicinity of the inner periphery thereof), as viewed from the front, is installed in the aforementioned rear space of the external casing 21.

The lens barrel 50 is provided with a barrel body 51 having a substantially cylindrical shape, and is provided in the barrel body 51 with lens groups, a lens drive mechanism which moves the lens groups forward and rearward in an optical axis direction, a motor which applies a driving force to the lens drive mechanism, and a memory, etc., in which information on specifications (focal length information and the like) of the lens barrel 50, all of which are not shown in the drawings.

A lens-side mount ring 52, made of metal, which is formed as a circular ring-shaped member is fixed to the rear end surface of the barrel body 51. The lens-side mount ring 52 is integrally provided with a fixed ring portion 53 which is fixed to the rear end surface of the barrel body 51 and a rear surface of which forms a lens-side mount surface 53a, a cylindrical portion 54 which extends rearward from the fixed ring portion 53, and lens-side bayonet lugs 55, 56 and 57 which project from the rear end of the cylindrical portion 54 toward the outer peripheral side. The lens-side bayonet lugs 55, 56 and 57 are circular arc in shape about the optical axis of the aforementioned lens groups and formed to project from the cylindrical portion 54 so as to be arranged at substantially equi-angular intervals about the optical axis. As shown in the drawings, the lens-side bayonet lug 56 is greater in length (circumferential length) than the lens-side bayonet lug 57, and the lens-side bayonet lug 55 is even greater in length than the lens-side bayonet lug 56. In addition, a recessed portion 58 having a circular arc shape is formed in the outer edge of the lens-side bayonet lug 55. Lens-side circular-arc openings 59, 60 and 61, each of which is circular arc in shape about the optical axis, are formed between the adjacent lens-side bayonet lugs 55, 56 and 57. As shown in the drawings, the lens-side circular-arc opening 60, which is formed between the lens-side bayonet lugs 55 and 57, is greater in length (circumferential length) than the lens-side circular-arc opening 59, which is formed between the lens-side bayonet lugs 55 and 56, and the lens-side circular-arc opening 61, which is formed between the lens-side bayonet lugs 56 and 57, is greater in length than the lens-side circular-arc opening 60.

In addition, the lens-side bayonet lugs 55, 56 and 57 are provided on the rear edges of the outer peripheral surfaces thereof with rounded surfaces 55a, 56a and 57a, respectively, each of which is chamfered into a curved surface having a predetermined radius of curvature.

Additionally, the lens-side bayonet lugs 55, 56 and 57 and the recessed portion 58 correspond in circumferential length and shape to the body-side circular-arc openings 28, 29 and 30 and the protrusion 32 on the camera body 20 side, respectively; likewise, the body-side bayonet lugs 25, 26 and 27 and the protrusion 32 on the camera body 20 side correspond in size and shape to the lens-side circular-arc openings 61, 60 and 59 and the recessed portion 58 on the lens side, respectively. Accordingly, when the lens barrel 50 is mounted to the camera body 20, the lens-side bayonet lugs 55, 56 and 57 and the recessed portion 58 can enter to a point behind the rear surfaces of the body-side bayonet lugs 25, 26 and 27 on the camera body 20 side through the body-side circular-arc openings 28, 29 and 30 and the protrusion 32 on the camera body 20 side, respectively.

In addition, a lock hole 62 is formed in the lens-side mount surface 53a.

An insulating member 63 that is a ring-shaped member made of synthetic resin is fixed to the inner peripheral part of the rear surface of the fixed ring member 53.

Additionally, an inner cylindrical member 66 made of synthetic resin is fixed to the inner peripheral part of the rear surface of the insulating member 63. A circular hole 67 through which the aforementioned lens groups are rearwardly exposed is formed in a center of the rear end surface of the inner cylindrical member 66.

Figure 4:
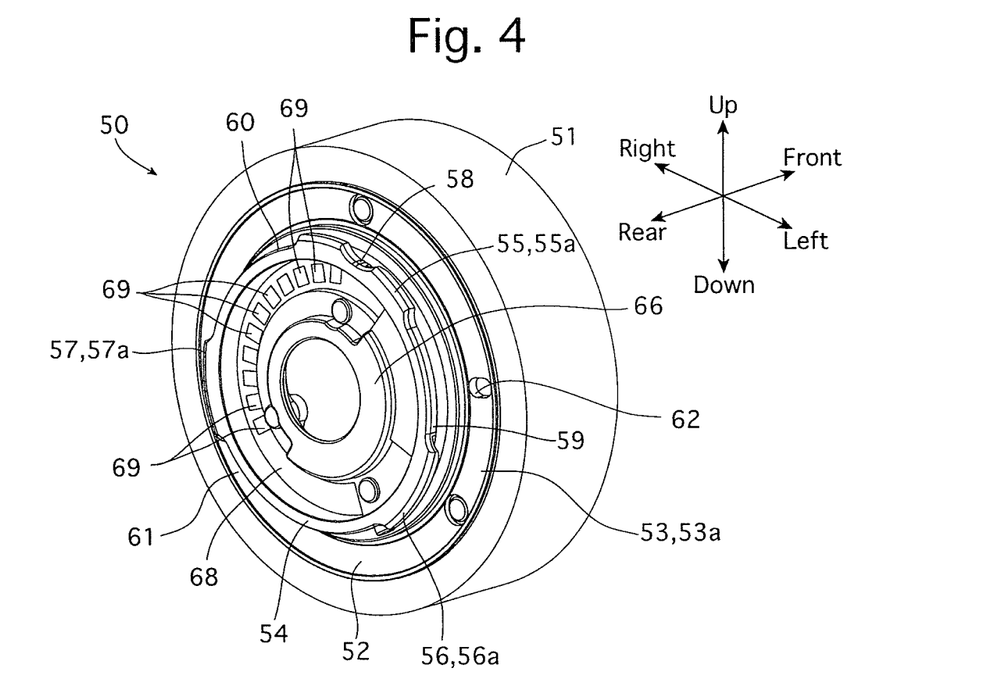
FIG. 4 is a rear perspective view of the lens barrel, wherein the barrel body thereof is abbreviated.
Figure 5:
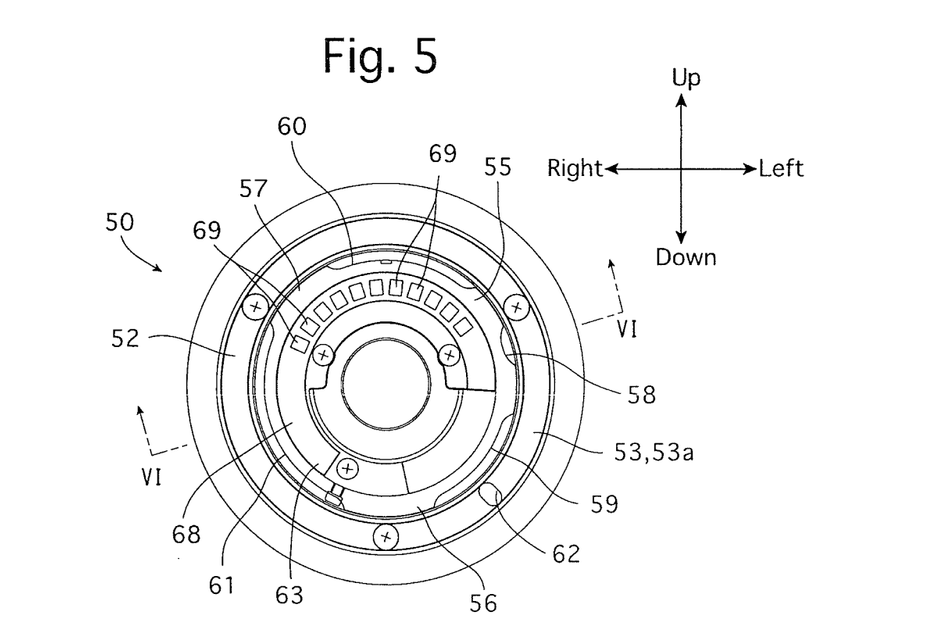
FIG. 5 is a rear elevational view of the lens barrel, wherein the barrel body thereof is abbreviated.
Figure 6:
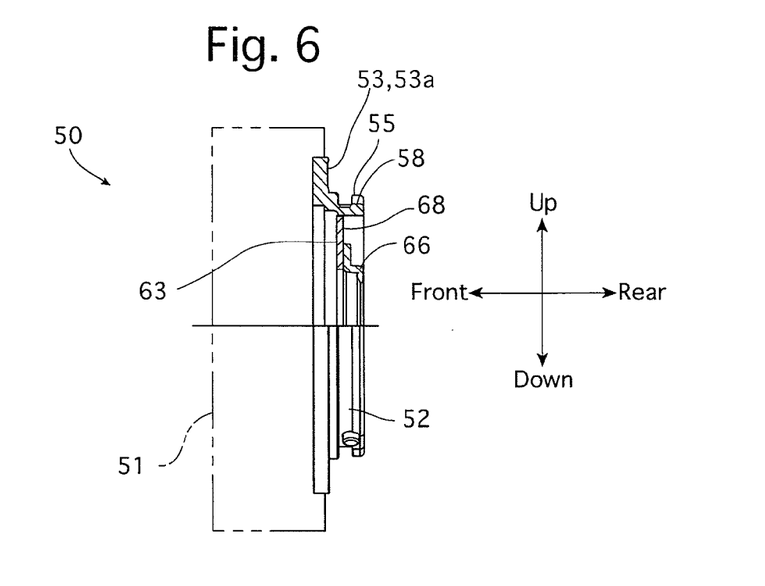
FIG. 6 is a side elevational view of the lens barrel, illustrating only an upper half thereof as across section taken along the line VI-VI shown in FIG. 5, wherein the barrel body is shown by an imaginary line.

As shown in FIGS. 4, 5 and 7, a recessed groove 68 in the shape of a circular arc as viewed from rear is formed between the cylindrical portion 54 of the lens-side mount ring 52 and the inner cylindrical member 66, and a plurality (the same number as the contact points 40, 40a, 41 and 41a) of contacts 69 (lens-side contact portions), made of metal, are fixed to the rear of the insulating member 63, which forms the bottom of the recessed groove 68, to be arranged at equi-angular intervals in a circumferential direction. The contacts 69 are connected to the aforementioned motor and memory, etc.

Next, a manner of mounting the lens barrel 50 to the camera body 20 will be discussed hereinafter.

First, the center axis of the opening hole 22 and the lens optical axis of the lens barrel 50 are brought into alignment with each other, and the circumferential position of the recessed portion 58 is made coincident with the protrusion 32; in this state, the rear end of the lens barrel 50 is brought close to the body-side mount ring 23 of the camera body 20 from front, and subsequently, the lens-side bayonet lug 55 is brought into the internal space of the external casing 21 through the body-side circular-arc opening 28. Subsequently, the lens-side bayonet lug 56 is brought into the internal space of the external casing 21 through the body-side circular-arc opening 29, and the lens-side bayonet lug 57 is brought into the internal space of the external casing 21 through the body-side circular-arc opening 30. Upon the lens-side bayonet lug 55 being inserted into the body-side circular-arc opening 28, the recessed portion 58 is loosely fitted on the protrusion 32 (the recessed portion 58 passes through the outside of the protrusion 32), and accordingly, the lens-side bayonet lug 55 enters the internal space of the external casing 21 without contacting the body-side bayonet lugs 26 or 27, or the protrusion 32. Upon the lens-side bayonet lugs 55, 56 and 57 being brought into the internal space of the external casing 21 (brought to the rear of the body-side bayonet lugs 25, 26 and 27), the lens-side mount surface 53a of the lens barrel 50 comes into contact with the body-side mount surface 24 of the camera body 20 from front, and the lock pin 34 positioned in the locked position is pressed to the unlocked position by a portion of the lens-side mount surface 53a (and simultaneously, the lock release button 35 positioned in the non-operating position moves to the operating position). In this state, rotating the entire lens barrel 50 clockwise by an angle of approximately 60 degrees, as viewed from the front, causes the lock hole 62 to be positioned immediately in front of the lock pin 34, which causes the lock pin 34 held in the unlocked position by the lens-side mount surface 53a to move back to the locked position by the biasing force of the aforementioned biaser (simultaneously causes the lock release button 35 in the operating position to move back to the non-operating position by the biasing force of the aforementioned biaser) to thereupon be engaged in the lock hole 62, which prevents the lens barrel 50 from further rotating. Additionally, as shown in FIG. 7, since a portion of the cylindrical portion 54 is positioned in a recess-shaped circular-arc space 45 between the circular arc protrusion 39 and the body-side mount surface 24, when the lens barrel 50 rotates, the rotating operation of the lens barrel 50 is smoothly performed. Additionally, since the lens-side bayonet lugs 55, 56 and 57 are positioned immediately behind the body-side bayonet lugs 26, 27 and 25 while resiliently deforming the biasing springs S2, S3 and S1 forward and since the lens-side bayonet lugs 55, 56 and 57 are pressed rearward by the rearward biasing forces of the biasing springs S2, S3 and S1, the contact state between the lens-side mount surface 53a and the body-side mount surface 24 is maintained. Accordingly, after the lens barrel 50 is mounted to the camera body 20 in this manner, the lens barrel 50 does not come off the camera body 20 unless the lock release button 35 is operated. At this time, the protrusion 32 is located at a different circumferential position from the lens-side bayonet lugs 55, 56 and 57.

On the other hand, when the lens barrel 50 is mounted to the camera body 20, the lens barrel 50 cannot be mounted to the camera body 20 if the circumferential position of the recessed portion 58 is not made coincident with the protrusion 32. For instance, in the case where the lens-side bayonet lug 57, the lens-side bayonet lug 56 and the lens-side bayonet lug 55 are positioned at the same circumferential positions as the body-side circular-arc opening 28, the body-side circular-arc opening 30 and the body-side circular-arc opening 29, respectively, the lens-side bayonet lugs 55, 56 and 57 cannot be inserted into the internal space of the external casing 21 even if the axis of the lens barrel 50 is made to be inclined with respect to the aforementioned center axis of the camera body 20 because the length (circumferential length) of the lens-side bayonet lug 57 is far greater than the distance between the protrusion 32 and the body-side bayonet lug 26 and the distance between the protrusion 32 and the body-side bayonet lug 27, the lens-side bayonet lug 56 is greater in length than the body-side circular-arc opening 30 and the lens-side bayonet lug 55 is greater in length than the body-side circular-arc opening 29. Likewise, also in the case where the lens-side bayonet lug 55, the lens-side bayonet lug 56 and the lens-side bayonet lug 57 are positioned at the same circumferential positions as the body-side circular-arc opening 30, the body-side circular-arc opening 28 and the body-side circular-arc opening 29, respectively, the lens-side bayonet lugs 55, 56 and 57 cannot be inserted into the internal space of the external casing 21 even if the axis of the lens barrel 50 is made to be inclined with respect to the aforementioned center axis of the camera body 20 because the lens-side bayonet lug 55 is greater in length (circumferential length) than the body-side circular-arc opening 30, the lens-side bayonet lug 57 is greater in length than the body-side circular-arc opening 29, and the length of the lens-side bayonet lug 56 is far greater than the distance between the protrusion 32 and the body-side bayonet lug 26 and the distance between the protrusion 32 and the body-side bayonet lug 27.

Additionally, if the optical axis of the lens barrel 50 is inclined with respect to the center axis of the opening hole 22 when the lens barrel 50 is mounted to the camera body 20, the lens-side bayonet lug 55, 56 or 57 attempts to enter the body-side circular-arc opening 30 in a slanting direction. However, since this lens-side bayonet lugs 55, 56 or 57 is to come into contact with a central portion of the circular arc protrusion 39, the lens-side bayonet lugs 55, 56 and 57 are prevented from entering the inside of the camera body 20. Accordingly, the lens barrel 50 can be mounted to the camera body 20 only from a proper direction (i.e., from a direction substantially parallel to the optical axis).

Consequently, improper mounting, such as connecting the lens barrel 50 to the camera body 20 without making the circumferential position of the recessed portion 58 coincident with the protrusion 32 and/or mounting the lens barrel 50 to the camera body 20 with the lens barrel 50 inclined to the camera body 20, can be prevented with reliability.

Upon the lens barrel 50 being mounted to the camera body 20, the contact pins 40, 40a, 41 and 41a of the camera body 20 are positioned in the recessed groove 68 of the lens barrel 50, and the rear end of each contact 69 of the lens barrel 50 comes in contact with the front end of the contact pin 40, 40a, 41 or 41a of the camera body 20 while pressing the corresponding contact pin 40 or 41 from the projected position toward the pressed position. Therefore, upon a main switch provided on the external casing 21 being turned ON, power of the battery is supplied from the two contact pins 40 and 40a to the corresponding contacts 69, and the camera body 20 reads information stored in the aforementioned memory of the lens barrel 50 via the contacts pins 41 and 41a and the contacts 69.

When the lens barrel 50 is detached from the camera body 20, firstly the lock release button 35 in the non-operating position is manually pressed to the operating position to move the lock pin 34 that is in the locked position to the unlocked position to move the lock pin 34 out of the lock hole 62. Thereupon, the lens barrel 50 becomes rotatable relative to the camera body 20, so that the recessed portion 58 is brought to a position immediately behind the protrusion 32 by rotating the lens barrel 50 counterclockwise by an angle of approximately 60 degrees as viewed from the front, and the entire lens barrel 50 is moved forward with respect to the camera body 20. Thereupon, the lens-side bayonet lug 55 moves forward out of the internal space of the external casing 21 through the body-side circular-arc opening 28, the lens-side bayonet lug 56 moves forward out of the internal space of the external casing 21 through the body-side circular-arc opening 29, and the lens-side bayonet lug 57 moves forward out of the internal space of the external casing 21 through the body-side circular-arc opening 30, so that the lens barrel 50 is disengaged from the camera body 20.

As described above, the present embodiment of the camera body 10, the lens barrel 50 and the camera body 20 can be reliably prevented from being improperly mounted to each other.

Moreover, the improper mounting prevention device according to the present invention has a simple structure configured of the protrusion 32 and the circular arc protrusion 39, which are formed on the camera body 20, and the recessed portion 58, which is formed on the lens barrel 50, thus not incurring a significant increase in cost, either.

In addition, since the front ends of the contact pins 40, 40a, 41 and 41a are positioned behind the body-side mount surface 24 and in front of the rear surfaces (opposed surfaces) of the body-side bayonet lugs 25, 26 and 27, the possibility of the hands, etc., of the user touching the contact pins 40, 40a, 41 and 41a when the lens barrel 50 is disengaged from the camera body 20 can be reduced.

Additionally, since the rounded surfaces 55a, 56a and 57a are provided on the lens-side bayonet lugs 55, 56 and 57, even if the rounded surfaces 55a, 56a and 57a are accidentally brought into contact with the contact pins 40, 40a, 41 and 41a when the lens barrel 50 is connected to the camera body 20, the contact pins 40, 40a, 41 and 41a can be prevented from being scratched.

Additionally, since the lens barrel 50 is structured such that the contacts 69 are positioned inside the recessed groove 68, the possibility of the hands, etc., of the user touching the contacts 69 when the lens barrel 50 is disengaged from the camera body 20 can be reduced.

Additionally, if the hands, etc., of the user touch the contact pins 40, 40a, 41 and 41a when the lens barrel 50 is disengaged from the camera body 20, the contact pins 40, 40a, 41 and 41a absorb the pressing force transmitted from the hands, etc., of the user by moving completely inside the pin support holes against the biasing forces of the compression coil springs 42, the contact pins 40, 40a, 41 and 41a can be prevented from being damaged. Additionally, the entire contact pins 40, 40a, 41 and 41a are protected by the circular arc protrusion 39 since the contact pins 40, 40a, 41 and 41a are positioned completely inside the pin support holes.

Additionally, although the aforementioned rear space for accommodating the battery and controller, etc., is formed in part of the internal space of the external casing 21 which is located behind the intermediate support plate 37, since the front ends of the contact pins 40, 40a, 41 and 41a are positioned in front of the rear surfaces (opposed surfaces) of the body-side bayonet lugs 25, 26 and 27, the whole camera body 20 can be reduced in dimensions in the optical axis direction (slimmed down) (compared with the case where the front ends of the contact pins 40, 40a, 41 and 41a are positioned behind the rear surfaces of the body-side bayonet lugs 25, 26 and 27).

Additionally, since the recessed groove 68, which receives the circular arc protrusion 39 and the contact pins 40, 40a, 41 and 41a when the lens barrel 50 is connected to the camera body 20, is formed in the rear of the lens barrel 50, the camera 10 can be reduced in dimension in the optical axis direction (slimmed down) (compared with the case where the recessed groove 68 that receives the contact pins 40, 40a, 41 and 41a is not formed on the lens barrel 50).

Additionally, when the lens barrel 50 is disengaged from the camera body 20, a part (upper part) of the image pickup device 44 (the light receiving area of the imaging surface thereof) is positioned immediately below the circular arc protrusion 39 (in the vicinity of the inner peripheral side of the circular arc protrusion 39) as viewed from front. Therefore, the circular arc protrusion 39 can prevent fingers of the user or the like from accidentally touching the image pickup device 44 (the light receiving area of the imaging surface thereof) or pressing the image pickup device 44 (the light receiving area of the imaging surface thereof).

Additionally, the front of the circular arc protrusion 39 protrudes forward to a position substantially identical to the positions of the body-side bayonet lugs 25 and 26 in the thickness direction of the camera body 20 (in a direction parallel to the center axis of the opening hole 22), and the body-side bayonet lugs 25 and 26 and the front surfaces of the circular arc protrusion 39 are substantially planar in arrangement (substantially lie in a plane), and accordingly, even when one accidentally touches the bayonet lugs 25 and 26 or the periphery of the circular arc protrusion 39, the edges of the bayonet lugs 25 and 26 can be prevented from hitting finger tips hard or finger tips can be prevented from being pinched between the edges of bayonet lugs 25 and 26 and the circular arc protrusion 39, which makes it possible to achieve a safer mount structure.

When the lens barrel 50 is mounted to the camera body 20, the circular arc protrusion 39 and the recessed groove 68 have a nested structure in which the circular arc protrusion 39 is surrounded by the recessed groove 68 (the cylindrical portion 54, the inner cylindrical member 66 and the bottom of the recessed groove) as shown in FIG. 7. Accordingly, even if light outside the camera 10 enters inside the camera 10 between the body-side mount surface 24 and the lens-side mount surface 53a, the possibility of this light reaching the inner peripheral side of the circular arc protrusion 39 to thereby exert an adverse effect on the light to be photographed which passes through the aforementioned lens groups is small.

In addition, as viewed from the front, a portion of the lens-side bayonet lug 57 lies on the same radial extension line as the contact pin 40a, and the biasing spring S1 biases this portion of the lens-side bayonet lug 57 rearward. Additionally, as viewed from front, a portion of the lens-side bayonet lug 55 lies on the same radial extension line as the contact pin 41a, and the biasing spring S2 biases this portion of the lens-side bayonet lug 55 rearward. Accordingly, it is possible to make the plurality of contact pins 40, 40a, 41 and 41a, which are arranged in a direction parallel to the circumferential direction of the body-side mount ring 23, come into contact with the corresponding contacts 69 securely with equal pressure.

Although the present invention has been described using the above illustrated embodiment, the present invention can be implemented with various modifications made to the above illustrated embodiment.

For instance, a configuration is possible in which the projection-depression relationship between the protrusion 32 that is provided on the camera body 20 side and the depression 58 that is provided on the lens barrel 50 side is reversely applied to the lens barrel 50 side and the camera body 20 side.

In this case, a structure in which the above camera-body-side mount structure and lens-barrel-side mount structure that have been described above are interchanged, namely, a modification is possible in which the lens-side mount ring 52 (the fixed ring portion 53) is provided with the protrusion 32 that is provided on the body-side mount ring 23, and in which the body-side mount ring 23 is provided with the recessed portion 58 that is provided on the lens-side mount ring 52.

Additionally, the number of the body-side bayonet lugs formed on the camera body 20 and the number of the lens-side bayonet lugs formed on the lens barrel 50 do not have to be three and can be any plural number (however, the number of the body-side bayonet lugs and the number of the lens-side bayonet lugs must be the same). Whatever the number of the body-side bayonet lugs may be, a biasing spring is installed at the rear of each body-side bayonet lug, while no biasing spring is installed at the rear of the protrusion 32.

Additionally, it is possible to make only some of the body-side bayonet lugs, only some of the circular-arc openings (which are positioned between the body-side bayonet lugs), only some of the lens-side bayonet lugs and only some of the circular-arc openings (which are positioned between the lens-side bayonet lugs) different in length from the other there of, or to make all the body-side bayonet lugs, all the circular-arc openings (which are positioned between the body-side bayonet lugs), all the lens-side bayonet lugs and all the circular-arc openings (which are positioned between the lens-side bayonet lugs) mutually identical in length, rather than making all the body-side bayonet lugs, all the circular-arc openings (which are positioned between the body-side bayonet lugs), all the lens-side bayonet lugs and all the circular-arc openings (which are positioned between the lens-side bayonet lugs) mutually different in length. However, in each case, the distance (circumferential length) between the protrusion 32 and the body-side bayonet lug adjacent to the protrusion 32 is set to be greater than the length of the lens-side bayonet lug having the shortest length.

Additionally, the recessed groove 68 can be made as an annular groove which is positioned between the cylindrical portion 54 of the lens-side bayonet ring 52 and the inner cylindrical portion 66.

Additionally, the protrusion 32 can be provided in one of the circular arc grooves (among the circular arc grooves between the body-side bayonet lugs) other than the circular arc groove that is the greatest in length (e.g., can be provided in the circular arc groove which is the smallest in length).

Additionally, the present embodiment of the camera 10 is a digital camera which is provided on the camera body 20 with the image pickup device 44; however, the present invention can also be applied to a camera using sliver-salt film.

INDUSTRIAL APPLICABILITY

The present invention has industrial applicability because the lens barrel and the camera body can be securely prevented from being improperly mounted to each other by a simple structure without incurring any significant increase in cost, even in the case where the camera body is miniaturized.

REFERENCE SIGNS LIST

10 Camera
20 Camera body
21 External casing
22 Opening hole
23 Body-side mount ring
24 Body-side mount surface
26 27 Body-side bayonet lug
28 29 30 Body-side circular-arc opening
32 Protrusion
34 Lock pin
35 Lock release button
37 Intermediate support plate
38 Central rectangular aperture
39 Circular arc protrusion
40 41 Contact pin (body-side contact portion)
42 Compression coil spring (contact biaser)
44 Image pickup device
50 Lens barrel
51 Barrel body
52 Lens-side mount ring
53 Fixed ring portion
53a Lens-side mount surface
54 Cylindrical portion
55 56 57 Lens-side bayonet lug
58 Recessed portion
59 60 61 Lens-side circular-arc opening
62 Lock hole
63 Insulating member
66 Inner cylindrical member
67 Circular hole
68 Recessed groove
69 Contact (lens-side contact portion)
S1 S2 S3 Biasing spring (rearward biaser)

The invention claimed is:

1. A camera body comprising:
a substantially circular opening formed in a front side thereof, said substantially circular opening capable of receiving a lens barrel capable of being attached and detached to and from said opening, wherein said lens barrel includes a cylindrical portion extending rearward from said lens barrel, a plurality of lens-side bayonet lugs which are provided at a rear end of said cylindrical portion and project toward an outer peripheral side, a recessed portion which is formed on an outer edge of one of said lens-side bayonet lugs, and a lens-side mount surface,
a plurality of body-side bayonet lugs which are provided on a peripheral edge of said opening and project toward an inner peripheral side;
a protrusion which is positioned in a circular-arc opening, formed between mutually adjacent body-side bayonet lugs of said body-side bayonet lugs, said protrusion being loosely engaged in said recessed portion when each of said lens-side bayonet lugs is positioned in a corresponding said circular-arc opening, and being positioned at a different circumferential position from said lens-side bayonet lugs which are positioned immediately behind said body-side bayonet lugs, wherein a distance between said protrusion and either of adjacent two body-side bayonet lugs of said body-side bayonet lugs is shorter than the length of each of said lens-side bayonet lugs; and
a body-side mount surface with which said lens-side bayonet surface comes into contact from a front side when said lens-side bayonet lugs are positioned immediately behind said body-side bayonet lugs;
wherein said body-side bayonet lugs have a circular-arc shape, and
wherein said camera body comprises a circular arc protrusion which is positioned inside said camera body and projects forward, said circular arc protrusion being spaced toward said inner peripheral side from one of said circular-arc openings on which said protrusion is not provided and two of said body-side bayonet lugs that are adjacent to said one of circular-arc openings on which said protrusion is not provided, and said circular protrusion being concentric with said body-side bayonet lugs, and wherein a recess-shaped circular-arc space is defined between said circular arc protrusion and said body-side mount surface so that said cylindrical portion is positioned in said recess-shaped circular-arc space, when said lens barrel rotates.

2. The camera body according to claim 1, wherein the number of said body-side bayonet lugs and the number of said lens-side bayonet lugs are three.

3. The camera body according to claim 2, wherein at least one of said three body-side bayonet lugs is different in length from the other of said three body-side bayonet lugs, and wherein said protrusion is positioned in one of three of the circular-arc openings that is the greatest in length.

4. The camera body according to claim 2, wherein said three body-side bayonet lugs are mutually different in length.

5. The camera body according to claim 1, wherein said cylindrical portion is inserted in between said circular arc protrusion and said body-side mount surface when said cylindrical portion is positioned in said recess-shaped circular-arc space.

6. A lens barrel capable of being attached and detached to and from a substantially circular opening formed in a front side of a camera body, wherein said camera body includes a plurality of body-side bayonet lugs which are provided on a peripheral edge of said opening and project toward an inner peripheral side, a circular arc protrusion is positioned inside the camera body and projects forwardly, a protrusion which is fixedly provided on said peripheral edge of said opening at a position in a circular-arc opening provided between adjacent body-side bayonet lugs of the body-side bayonet lugs, a body-side mount surface and a recess-shaped circular arc space is defined between the circular arc protrusion and the body side mount surface, a cylindrical portion extending rearwardly from said lens barrel, said cylindrical portion being positioned in the recess-shaped circular-arc space when said lens barrel rotates said lens barrel comprising:

a plurality of lens-side bayonet lugs which are provided at a rear end of said cylindrical portion and project toward an outer peripheral side, each of said lens-side bayonet lugs being longer than a distance between said protrusion and either of adjacent two body-side bayonet lugs of said body-side bayonet lugs, and being positioned at different circumferential positions from said protrusion when positioned immediately behind said body-side bayonet lugs;

a recessed portion which is provided on an outer edge of one of said lens-side bayonet lugs, and in which the protrusion of the camera body is loosely engaged when each said lens-side bayonet lugs is positioned in a corresponding said circular-arc opening; and a lens-side mount surface which comes into contact with said body-side bayonet surface from the front side when said lens-side bayonet lugs are positioned immediately behind said body-side bayonet lugs.

7. The lens barrel according to claim 6, wherein the number of said body-side bayonet lugs and the number of said lens-side bayonet lugs are three.

8. The camera body according to claim 7, wherein at least one of said three lens-side bayonet lugs is different in length from the other of said three lens-side bayonet lugs, and wherein said recessed portion is formed on one of said three lens-side bayonet lugs that is the greatest in length.

9. A lens-interchangeable camera comprising:

a camera body which includes a plurality of body-side bayonet lugs which are provided on a peripheral edge of an opening formed in a front side of said camera body and project toward an inner peripheral side, a protrusion which is positioned in a circular-arc opening formed between adjacent body-side bayonet lugs of said body-side bayonet lugs, and a body-side mount surface; and a lens barrel which includes a cylindrical portion extending rearward from said lens barrel, a plurality of lens-side bayonet lugs which are provided at a rear end of said cylindrical portion and project toward an outer peripheral side, each of said lens-side bayonet lugs being longer than a distance between said protrusion and either of adjacent two body-side bayonet lugs of said body-side bayonet lugs, and being positioned at different circumferential positions from said protrusion when positioned immediately behind said body-side bayonet lugs;

a recessed portion which is formed on an outer edge of one of said lens-side bayonet lugs, and in which said protrusion is loosely engaged when each said lens-side bayonet lugs is positioned in a corresponding said circular-arc opening; and a lens-side mount surface which comes into contact with said body-side bayonet surface from the front side when said lens-side bayonet lugs are positioned immediately behind said body-side bayonet lugs;

wherein said body-side bayonet lugs have a circular-arc shape, and wherein said camera body comprises a circular arc protrusion which is positioned inside said camera body and projects forward, said circular arc protrusion being spaced toward said inner peripheral side from one of said circular-arc openings on which said protrusion is not provided and two of said body-side bayonet lugs that are adjacent to said one of circular-arc openings on which said protrusion is not provided, and said circular protrusion being concentric with said body-side bayonet lugs, and wherein a recess-shaped circular-arc space is defined between said circular arc protrusion and said body-side mount surface so that said cylindrical portion is positioned in said recess-shaped circular-arc space, when said lens barrel rotates.

10. The lens-interchangeable camera according to claim 9, wherein said cylindrical portion is inserted in between said circular arc protrusion and said body-side mount surface when said cylindrical portion is positioned in said recess-shaped circular-arc space.

11. A lens-interchangeable camera comprising:

a camera body which includes a plurality of body-side bayonet lugs which are provided on a peripheral edge of an opening formed in a front side of said camera body and project toward an inner peripheral side, a plurality of body-side circular-arc openings which are formed between said body-side bayonet lugs that are adjacent to one another, a circular arc protrusion is positioned inside the camera body and projects forward a body-side mount surface and a recess-shaped circular arc space is defined between the circular arc protrusion and the body side mount surface; and a lens barrel which includes a plurality of lens-side bayonet lugs which are provided at a rear end of said lens barrel and project toward an outer peripheral side, a plurality of lens-side circular-arc openings which are formed between said lens-side bayonet lugs that are adjacent to one another, a lens-side mount surface which comes into contact with said body-side bayonet surface from the front side when said lens-side bayonet lugs are positioned immediately behind said body-side bayonet lugs and a cylindrical portion extending rearwardly from said lens, said cylindrical portion being positioned in the recess-shaped circular-arc space when said lens barrel rotates, wherein one of a recessed portion is formed on one of said lens-side bayonet lugs, and a protrusion, which is loosely engaged in said recessed portion when each said lens-side bayonet lugs is positioned in corresponding one of said body-side circular-arc openings and which is positioned at a different circumferential position from said lens-side bayonet lugs positioned immediately behind said body-side bayonet lugs, is provided in one of said body-side circular-arc openings, wherein a distance between said protrusion and either of adjacent two body-side bayonet lugs of said body-side bayonet lugs is shorter than each of said lens-side bayonet lugs, and a recessed portion is formed on one of said body-side bayonet lugs, and a protrusion, which is loosely engaged in said recessed portion when each said body-side bayonet lugs is positioned in corresponding one of said lens-side circular-arc openings and which is positioned at a different circumferential position from said body-side bayonet lugs positioned immediately in front of said lens-side bayonet lugs, is provided in one of said lens-side circular-arc openings, wherein a distance between said protrusion and either of adjacent two lens-side bayonet lugs of said lens-side bayonet lugs is shorter than each of said body-side bayonet lugs; and wherein the number of said body-side bayonet lugs and the number of said lens-side bayonet lugs are three; and wherein at least one of said three body-side bayonet lugs is different in length from another of said three body-side bayonet lugs, wherein said protrusion is positioned in one of three of said circular-arc openings that is the greatest in length, wherein at least one of said three lens-side bayonet lugs is different in length from the other of said three lens-side bayonet lugs, and wherein said recessed portion is formed on one of said three lens-side bayonet lugs that is the greatest in length.

* * * * *